F. W. McCLOSKEY.
AXLE COLLAR FOR RAILWAY MOTORS.
APPLICATION FILED AUG. 17, 1920.
1,409,745.
Patented Mar. 14, 1922.
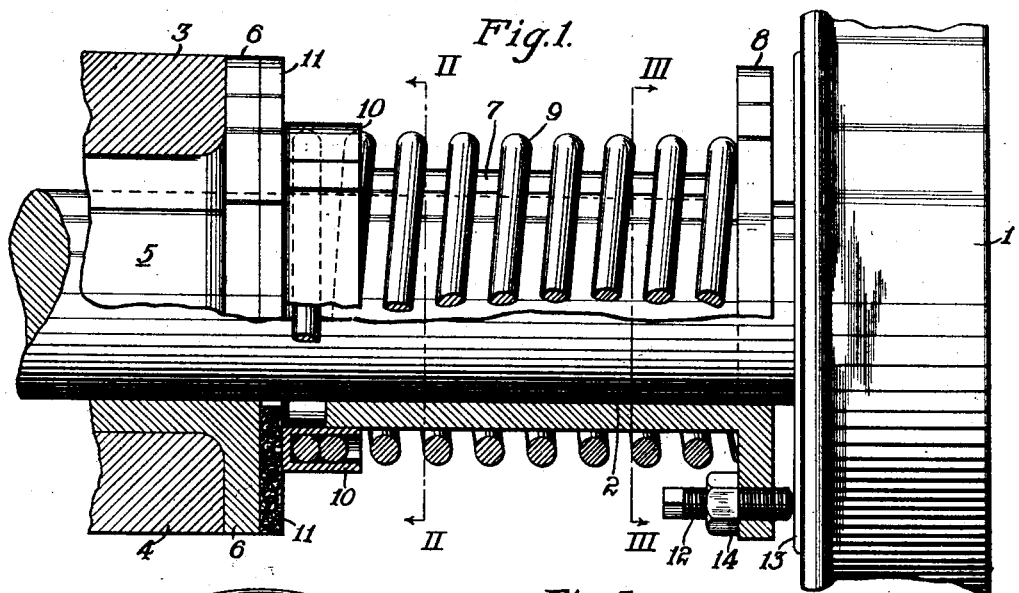
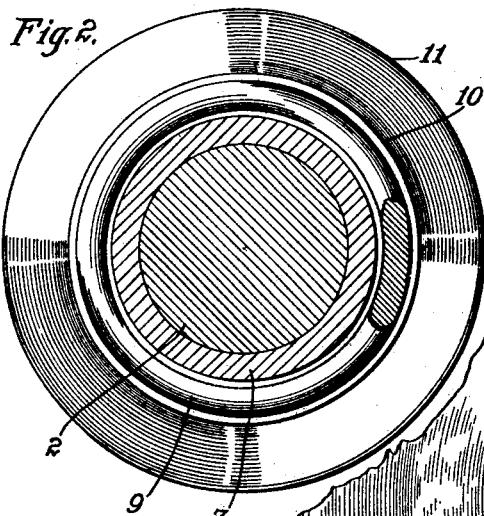
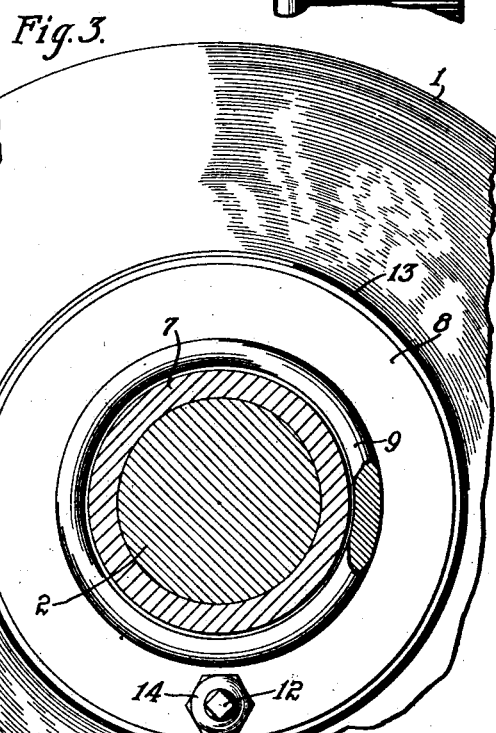
WITNESSES:
H. J. Shelhamer
Marshall Low
INVENTOR
Frederick W. McCloskey
BY
Wesley G. Carr
ATTORNEY

UNITED STATES PATENT OFFICE.

FREDERICK W. McCLOSKEY, OF EDGEWOOD PARK, PENNSYLVANIA, ASSIGNOR TO WESTINGHOUSE ELECTRIC & MANUFACTURING COMPANY, A CORPORATION OF PENNSYLVANIA.

AXLE COLLAR FOR RAILWAY MOTORS.

1,409,745.  Specification of Letters Patent.  Patented Mar. 14, 1922.

Application filed August 17, 1920. Serial No. 404,246.

*To all whom it may concern:*

Be it known that I, FREDERICK W. MC-CLOSKEY, a subject of the King of Great Britain, and a resident of Edgewood Park, in the county of Allegheny and State of Pennsylvania, have invented a new and useful Improvement in Axle Collars for Railway Motors, of which the following is a specification.

My invention relates to axle-enclosing devices for spacing purposes and it has special relation to devices of the character described and adapted for suitably positioning electric motors on the wheel axles of electric railway vehicles and the like.

Heretofore, it has been customary to construct an axle collar in two halves and to secure the same to the axle by means of a plurality of bolts.

One of the objects of my invention is to provide an axle collar that will resiliently engage the wheel hub and mounting of an electric motor and will not only yieldably maintain the motor in proper spaced relation to the driving wheel, but will absorb and reduce all axial shocks that may occur.

Another object of my invention is to provide a device of the character designated that shall be simple, of low cost of construction and of relatively light weight.

In the accompanying drawings:

Figure 1 is a side view, partially in elevation and partially in section, of an axle collar of a vehicle-wheel truck embodying a preferred form of my invention.

Fig. 2 is a transverse section on line II—II of Fig. 1.

Fig. 3 is a transverse section on line III—III of Fig. 1.

Referring to the drawings, the structure is shown as comprising a working member, such as a vehicle wheel 1, having a suitable axle or shaft 2. An electric motor, not shown, is supported by the shaft a predetermined distance from the wheel 1, depending upon the relative dimensions of the electric motor and the wheel axle, as will be understood, and having an axle bearing 3 that is enclosed by a bearing cap 4, of usual construction.

The axle is spaced from the parts 3 and 4 by a split bushing or axle bearing 5 having a peripheral flange 6. The axle collar comprises a sleeve 7, preferably forced into place against the spring prior to securing the wheel to the axle, and is provided with a peripheral flange 8 at one end thereof. In forcing the sleeve 7 into place, sufficient clearance should be allowed between the inner end thereof and the motor bearing to allow the latter to have ample axial movement.

A helical compression spring 9 surrounds the sleeve 7 and is interposed between the inner face of the flange 8 and an annular spring seat 10, preferably of channel construction, that is slidably mounted on the sleeve 7 and extends beyond the end thereof and into engagement with a split wear plate or disk 11, preferably of fibrous material, with which the flange 6 of the split bushing 5 is provided. The flange 8 is provided with a set screw 12 for engagement with a hub 13 of a wheel 1 and is held in its adjusted position by means of a lock nut 14.

By this construction, the motor is yieldably maintained in proper spaced relation, and the pressure exerted by the spring 9 may be regulated by the set screw 12. Also, by means of the set screw 12, an axle collar of this construction may be adjusted to fit axles of different lengths, according to the gauge of the track, and the spring may always be maintained under a proper degree of compression.

I claim as my invention:

1. An axle collar comprising an axle-engaging member, a spring surrounding the said member, and means slidably mounted on said member for supporting one end of said spring.

2. An axle collar comprising a sleeve adapted to be secured to an axle and having a flange at one end thereof, a spring surrounding said sleeve and engaging said flange, and a seat slidably mounted on said sleeve for supporting the other end of said spring.

3. An axle collar comprising a sleeve having a flange at one end thereof, a spring surrounding the said sleeve and engaging the said flange, a seat mounted on said sleeve for the other end of said spring, and means carried by said sleeve for regulating the degree of compression of said spring.

4. An axle collar adapted to be secured to an axle between a wheel and a motor frame and comprising a sleeve having a flange at one end thereof, a spring mounted on the sleeve and in engagement with said flange, a seat for one end of said spring slidably mounted on the sleeve and an adjusting screw carried by said flange for engagement with the wheel.

5. An axle collar comprising a sleeve having a peripheral flange at one end thereof, a helical spring surrounding the sleeve and engaging said flange, an annular member slidably mounted on said sleeve for engagement by the other end of said spring, and means carried by said flange for adjusting the degree of compression of said spring.

In testimony whereof, I have hereunto subscribed my name this 4th day of August, 1920.

FREDERICK W. McCLOSKEY.